(12) United States Patent
Zhang et al.

(10) Patent No.: US 12,501,815 B2
(45) Date of Patent: Dec. 16, 2025

(54) DISPLAY ASSEMBLY

(71) Applicants: Beijing BOE Technology Development Co., Ltd., Beijing (CN); BOE TECHNOLOGY GROUP CO., LTD., Beijing (CN)

(72) Inventors: Yafei Zhang, Beijing (CN); Mengwen Jia, Beijing (CN); Feng Qu, Beijing (CN); Biqi Li, Beijing (CN); Mengxia Yu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 555 days.

(21) Appl. No.: 17/920,106

(22) PCT Filed: Oct. 29, 2021

(86) PCT No.: PCT/CN2021/127629
§ 371 (c)(1),
(2) Date: Oct. 20, 2022

(87) PCT Pub. No.: WO2023/070575
PCT Pub. Date: May 4, 2023

(65) Prior Publication Data
US 2024/0224767 A1     Jul. 4, 2024

(51) Int. Cl.
*H10K 59/80* (2023.01)
*G06F 3/044* (2006.01)
(Continued)

(52) U.S. Cl.
CPC ....... *H10K 59/8794* (2023.02); *G06F 3/0446* (2019.05); *H01Q 1/243* (2013.01);
(Continued)

(58) Field of Classification Search
CPC ...... H10K 59/00–95; G06F 3/041–047; G06F 2203/041–04114; G06F 3/0412;
(Continued)

(56) References Cited

U.S. PATENT DOCUMENTS 10,551,949 B2 *   2/2020   Chai ................... H01Q 1/1271
2002/0036593 A1 * 3/2002   Ying ......................... H01Q 1/40
                                                                343/702
(Continued)

FOREIGN PATENT DOCUMENTS

CN      208460972 U     2/2019
CN      110994133 A     4/2020
(Continued)

OTHER PUBLICATIONS

JP-2021044611-A (Year: 2021).*

*Primary Examiner* — Sanjiv D. Patel
(74) *Attorney, Agent, or Firm* — HOUTTEMAN LAW LLC

(57) ABSTRACT

The present disclosure provides a display assembly. The display assembly includes a display panel with a heat dissipation region; a heat dissipation assembly in the heat dissipation region and on a side of the display panel distal to a display surface of the display panel; and an antenna assembly in the heat dissipation region, with at least part of the antenna assembly located on the side of the display panel distal to the display surface.

18 Claims, 7 Drawing Sheets

(51) Int. Cl.
*H01Q 1/24* (2006.01)
*H01Q 1/38* (2006.01)
*H10K 59/35* (2023.01)

(52) U.S. Cl.
CPC ............ *H01Q 1/38* (2013.01); *H10K 59/353* (2023.02); *G06F 2203/04112* (2013.01)

(58) Field of Classification Search
CPC ........ H01Q 21/065; H01Q 5/35; H01Q 9/045; H01Q 9/0407; H01Q 1/523; H10Q 1/243
See application file for complete search history.

(56) References Cited

U.S. PATENT DOCUMENTS

| | | | |
|---|---|---|---|
| 2007/0210962 A1* | 9/2007 | Yang | H01Q 9/0428 343/893 |
| 2015/0123860 A1* | 5/2015 | Park | H01Q 1/526 343/720 |
| 2018/0158429 A1* | 6/2018 | Na | H10N 10/13 |
| 2018/0364846 A1* | 12/2018 | Ahn | G06F 3/0412 |
| 2019/0058264 A1* | 2/2019 | Jung | H01Q 9/0435 |
| 2021/0263606 A1* | 8/2021 | Lee | G06F 3/0445 |

FOREIGN PATENT DOCUMENTS

| | | | |
|---|---|---|---|
| CN | 112612374 A | | 4/2021 |
| CN | 113066390 A | | 7/2021 |
| CN | 113066815 A | | 7/2021 |
| CN | 113160708 A | | 7/2021 |
| JP | 2021044611 A | * | 3/2021 |

* cited by examiner

DISPLAY ASSEMBLY

CROSS-REFERENCE TO RELATED APPLICATIONS

This is a National Phase Application filed under 35 U.S.C. 371 as a national stage of PCT/CN2021/127629 filed on Oct. 29, 2021, the content of which is incorporated herein by reference in its entirety.

TECHNICAL FIELD

The present disclosure belongs to the field of display technology, and particularly relates to a display assembly.

BACKGROUND

The fifth generation mobile communication (5G) technology has the characteristics of higher data transmission rate and low latency, and thus is a main development direction of communications in the future. The core technology of the 5G technology is millimeter waves. Millimeter wave systems for terminals have not been commercialized at present. The millimeter waves have the characteristics of short wavelength and fast signal attenuation. In order to realize high coverage, a millimeter wave system for a terminal adopts a multi-beam system, and is used together with a plurality of antennas, so as to cover different directions. In 4G bands, most antennas for the terminals adopt dipole antennas, and have the characteristics of small volume and wide bandwidth. In the 5G bands, microstrip antennas are often adopted to increase beam directivity, so as to realize the multi-beam system. However, due to complex electromagnetic structures of the terminals, the antennas at the terminals are prone to being affected by metal frames (or metal bezels) and display panel structures, resulting in a poor antenna pattern, which seriously affect the multi-beam system.

At present, there are two kinds of mainstream millimeter wave antennas for display terminals: Antenna in Package (AIP) and Antenna on Display (AOD). The AIP solution is to directly fabricate a millimeter wave antenna array on a package and thus can realize small loss, but the package of an assembly can only be disposed below a display screen, and forward radiation of a display panel is relatively weak because the display panel includes a large number of metal circuits and heat dissipation copper films. In the 4G bands, wavelengths of the antennas are longer and belong to a centimeter level, so that the millimeter waves can bypass the display panel. However, in the 5G bands, wavelengths of the antennas are shorter and belong to a millimeter (i.e., mm) level, resulting in significant reduction of the forward radiation of the display panel. The AOD solution is to fabricate a millimeter wave antenna right above the display panel, and can solve the problem of the forward radiation. But the AOD solution has the disadvantages that a bonded active region is relatively small (due to a mainstream trend of narrow borders) and a radio frequency board cannot be easily bent.

SUMMARY

Some embodiments of the present disclosure provide a display assembly.

In a first aspect, an embodiment of the present disclosure provides a display assembly, including:

a display panel with a heat dissipation region;

a heat dissipation assembly in the heat dissipation region and on a side of the display panel distal to a display surface of the display panel; and an antenna assembly in the heat dissipation region, with at least part of the antenna assembly located on the side of the display panel distal to the display surface.

In some examples, the antenna assembly is only located on the side of the display panel distal to the display surface; the antenna assembly includes a dielectric layer, at least one radiating element on a side of the dielectric layer proximal to the display panel, and a reference electrode layer on a side of the dielectric layer distal to the display panel; and orthogonal projections of the radiating element and the reference electrode layer on the dielectric layer at least partially overlap each other.

In some examples, the antenna assembly further includes at least one feeder line, and each of the at least one radiating element is connected to one of the at least one feeder line.

In some examples, the antenna assembly further comprises at least one first feeder line and at least one second feeder line, each of the at least one radiating element is respectively connected to one of the at least one first feeder line and one of the at least one second feeder line, and for any one radiating element, a connection node between the radiating element and a connected first feeder line and a connection node between the radiating element and a connected second feeder line are a first node and a second node, respectively; and a connecting line between the first node and a center of the radiating element and a connecting line between the second node and the center of the radiating element form a certain angle.

In some examples, the antenna assembly includes a dielectric layer on the side of the display panel distal to the display surface, at least one first radiating element on a side of the dielectric layer proximal to the display panel, a reference electrode layer on a side of the dielectric layer distal to the display panel, and at least one second radiating element on the display surface, and an orthogonal projection of each first radiating element on the dielectric layer and an orthogonal projection of a corresponding second radiating element on the dielectric layer at least partially overlap each other; and both an orthogonal projection of the first radiating element on the dielectric layer and an orthogonal projection of the corresponding second radiating element on the dielectric layer at least partially overlap an orthogonal projection of the reference electrode layer on the dielectric layer.

In some examples, the antenna assembly further includes at least one feeder line, and each of the at least one first radiating element is connected to one of the at least one feeder line.

In some examples, the antenna assembly further includes at least one first feeder line and at least one second feeder line, each of the at least one first radiating element is respectively connected to one of the at least one first feeder line and one of the at least one second feeder line, and for any one first radiating element, a connection node between the first radiating element and a connected first feeder line and a connection node between the first radiating element and a connected second feeder line are a first node and a second node, respectively; and a connecting line between the first node and a center of the first radiating element and a connecting line between the second node and the center of the first radiating element form a certain angle.

In some examples, the display assembly further includes a touch layer on the display surface of the display panel, the touch layer includes a plurality of touch electrodes in an array, and some touch electrodes in the heat dissipation region serve as second radiating elements in a time-division multiplexing manner.

In some examples, the touch layer further includes redundant electrodes on the same layer as the touch electrodes and between adjacent touch electrodes, with the redundant electrodes being discontinuous with edges of the touch electrodes.

In some examples, at least the second radiating element is a metal mesh structure.

In some examples, the display panel includes a plurality of sub-pixels, and an arrangement density of the sub-pixels in a region of the display panel, which overlaps an orthogonal projection of the antenna assembly on the display panel, is smaller than an arrangement density of the sub-pixels in the other region of the display panel.

In some examples, the antenna assembly and the heat dissipation assembly are disposed side by side.

In some examples, a slot is formed in a middle area of the heat dissipation assembly and provided therein with a feed cavity, and the antenna assembly is disposed on a side of a feed cavity proximal to the display surface.

In some examples, the heat dissipation assembly includes a heat dissipation layer, a buffer layer, and an adhesive layer, the buffer layer is between the heat dissipation layer and the adhesive layer, and the adhesive layer adheres to the display panel.

In some examples, the display assembly further includes a flexible printed circuit board bonded to the display panel, and an orthogonal projection of the flexible printed circuit board on the display panel and an orthogonal projection of the antenna assembly on the display panel do not overlap each other when the flexible printed circuit board is folded to the side of the display panel distal to the display surface.

DETAIL DESCRIPTION OF EMBODIMENTS

In order to enable one of ordinary skill in the art to better understand the technical solutions of the present disclosure, the present disclosure will be described in detail below with reference to the drawings and specific implementations.

Unless otherwise defined, technical terms or scientific terms used herein should have general meanings that are understood by those of ordinary skill in the technical field to which the present disclosure belongs. The words "first", "second" and the like used herein do not denote any order, quantity or importance, but are just used for distinguishing between different elements. Similarly, the words "an", "a", "the" and the like do not denote a limitation to quantity, and indicate the existence of "at least one" instead. The words "include", "comprise" and the like indicate that an element or object before the words covers the elements or objects or the equivalents thereof listed after the words, rather than excluding other elements or objects. The words "connect", "couple" and the like are not limited to physical or mechanical connection, but may also indicate electrical connection, whether direct or indirect connection. The words "on", "under", "left", "right" and the like are only used for indicating relative positional relationships. When an absolute position of an object described is changed, the relative positional relationships may also be changed accordingly.

Figure 1:
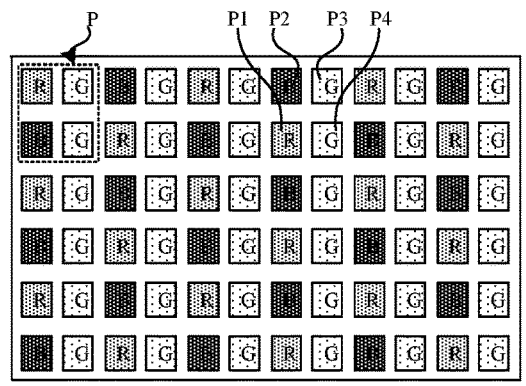
FIG. 1 is a plan view of a display panel.
Figure 2:
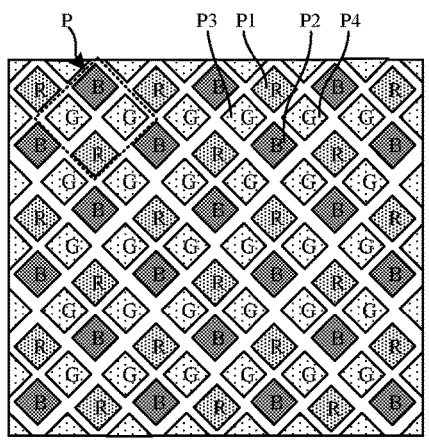
FIG. 2 is another plan view of the display panel.

FIG. 1 and FIG. 2 are schematic views of a display panel. In an exemplary implementation, the display panel may include a plurality of pixel units P arranged in an array, and at least one of the pixel units P may include one first sub-pixel P1 emitting light of a first color, one second sub-pixel P2 emitting light of a second color, and a third sub-pixel P3 and a fourth sub-pixel P4, each of which emits light of a third color; and each of the four sub-pixels may include a pixel driving circuit and a light emitting device. The pixel driving circuit may include a scan signal line, a data signal line, and a light emission signal line, and the pixel driving circuit is respectively connected to the scan signal line, the data signal line, and the light emission signal line. The pixel driving circuit is configured to receive a data voltage transmitted by the data signal line and output a corresponding current to the light emitting device, under the control of the scan signal line and the light emission signal line. In each of the sub-pixels, the light emitting device is connected to the pixel driving circuit, and is configured to emit light having corresponding brightness in response to the current output from the pixel driving circuit.

In some examples, the first sub-pixel P1 may be a red sub-pixel (R) emitting red light, the second sub-pixel P2 may be a blue sub-pixel (B) emitting blue light, and the third sub-pixel P3 and the fourth sub-pixel P4 may be green sub-pixels (G) emitting green light. In an exemplary implementation, shapes of the sub-pixels may be rectangles, diamonds, pentagons or hexagons. In an exemplary implementation, the four sub-pixels may be arranged in a shape of a square to form the pixel arrangement of GGRB, as shown in FIG. 1. In another exemplary implementation, the four sub-pixels may be arranged in a shape of a diamond to form the pixel arrangement of RGBG, as shown in FIG. 2. In other exemplary implementations, the four sub-pixels may be arranged side by side along a horizontal direction or along a vertical direction. In an exemplary implementation, the pixel unit may include three sub-pixels, and the three sub-pixels may be arranged side by side along the horizontal direction or along the vertical direction, or arranged in a shape of a triangle, which is not limited herein.

Figure 3:
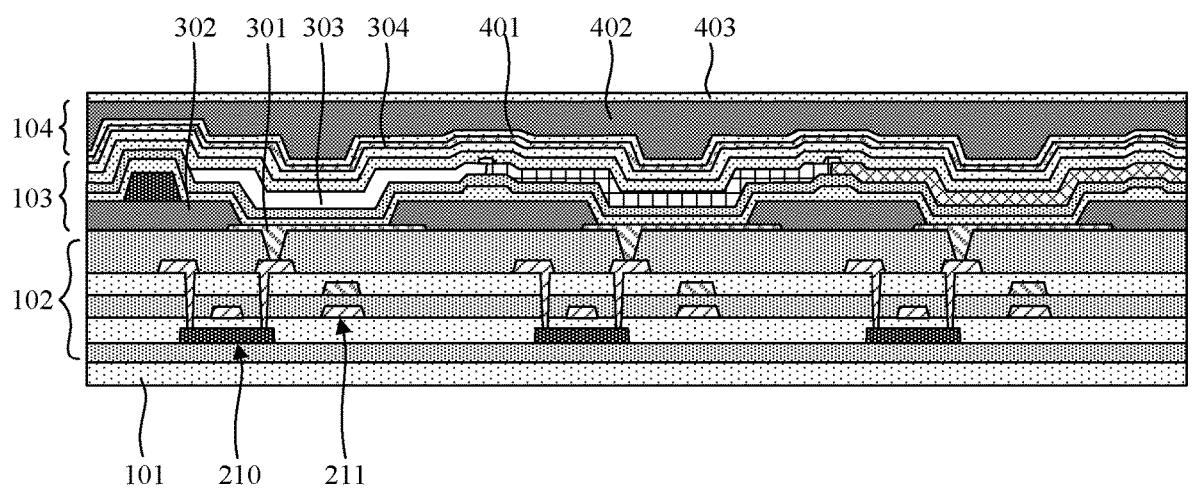
FIG. 3 is a sectional view of a display panel.

FIG. 3 is a sectional view of a display panel and illustrates structures of three sub-pixels of the display panel. As shown in FIG. 3, on a plane perpendicular to the display panel, the display panel may include a driving circuit layer 102 disposed on a base 101, a light emitting structure layer 103 disposed on a side of the driving circuit layer 102 distal to (or away from) the base, and a package layer 104 disposed on a side of the light emitting structure layer 103 distal to the base. In some feasible implementations, the display panel may further include other film layers such as spacer pillars, which are not limited herein.

In an exemplary implementation, the base 101 may be a flexible base or a rigid base. The driving circuit layer 102 of each sub-pixel may include a plurality of signal lines and a pixel driving circuit, and the pixel driving circuit may include a plurality of transistors and a storage capacitor. FIG. 3 merely illustrates an example where one driving transistor 210 and one storage capacitor 211 are annotated. The light emitting structure layer 103 of each sub-pixel may include a plurality of film layers constituting the light emitting device, the plurality of film layers may include an anode 301, a pixel defining layer 302, an organic light emitting layer 303, and a cathode 304. The anode 301 is connected to a drain electrode of a driving transistor 210 through a via, the organic light emitting layer 303 is connected to the anode 301, the cathode 304 is connected to the organic light emitting layer 303, and the organic light emitting layer 303 emits light of a corresponding color when driven by the anode 301 and the cathode 304. The package layer 104 may include a first package layer 401, a second package layer 402, and a third package layer 403, which are stacked together, the first package layer 401 and the third package layer 403 may be made of an inorganic material, the second package layer 402 may be made of an organic material, and the second package layer 402 is disposed between the first package layer 401 and the third package layer 403, thereby ensuring that external moisture is kept from entering the light emitting structure layer 103.

In an exemplary implementation, the organic light emitting layer 303 may include a Hole Injection Layer (HIL), a Hole Transport Layer (HTL), an Electron Block Layer (EBL), an Emitting Layer (EML), a Hole Block Layer (HBL), an Electron Transport Layer (ETL), and an Electron Injection Layer (EIL), which are stacked together. In an exemplary implementation, the hole injection layers of all the sub-pixels may be connected together as a common layer, the electron injection layers of all the sub-pixels may be connected together as a common layer, the hole transport layers of all the sub-pixels may be connected together as a common layer, the electron transport layers of all the sub-pixels may be connected together as a common layer, the hole block layers of all the sub-pixels may be connected together as a common layer, the emitting layers of adjacent sub-pixels may overlap each other partially or may be isolated from each other, and the electron block layers of adjacent sub-pixels may overlap each other partially or may be isolated from each other.

Figure 4:
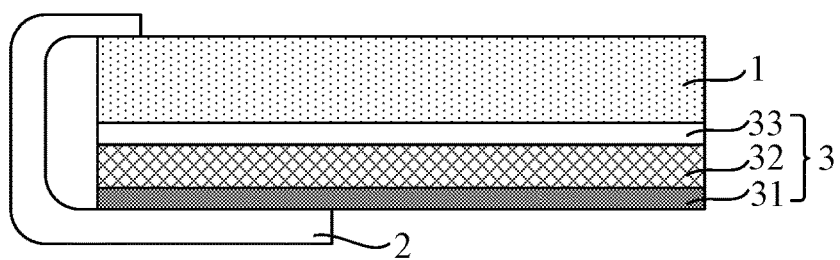
FIG. 4 is a sectional view of a display assembly.

FIG. 4 is a schematic diagram of an exemplary display assembly, which not only includes the display panel 1 as described above, but also includes a flexible printed circuit board 2 bonded to the display panel 1. The flexible printed circuit board 2 includes a chip-on-film transfer plate and a printed circuit board. A driver chip is disposed on the chip-on-film transfer plate bonded to the display panel 1, and the printed circuit board is bonded to the chip-on-film transfer plate. The display assembly includes a display region, a peripheral region surrounding the display region, and a first bonding region located on a side of the peripheral region distal to the display region. For example, the first bonding region is located on one side of the display region. A pad region includes a plurality of connection pads (contact pads), and each of the contact pads is configured to be electrically connected to a signal line extending from the display region or the peripheral region. The contact pads may be exposed from a surface of the first bonding region, that is, the contact pads are not covered by any layer, so that the contact pads may be easily electrically connected to the chip-on-film transfer plate, so as to be electrically connected to the printed circuit board. The printed circuit board is electrically connected to an external controller and is configured to transmit signals or power from the external controller. For example, the connection pads are electrically connected to data connecting lines (which are electrically connected to data lines in the display region). The connection pads are electrically connected to the signal lines, which enables communication between the signal lines and the flexible printed circuit board. The number of and the arrangement of the connection pads are not particularly limited herein, and may be set according to actual needs. When the display assembly is assembled, the chip-on-film transfer plate and the flexible printed circuit board need to be folded to a back side of the display panel 1. Since the driver chip and the printed circuit board in the flexible printed circuit board 2 generate heat when the flexible printed circuit board 2 supplies signals to the display panel 1, a heat dissipation assembly 3 is further provided between the flexible printed circuit board 2 and the display panel 1 for avoiding poor display of the display panel 1 caused by the generation of a large amount of heat. The heat dissipation assembly 3 generally includes an adhesive layer 33, a buffer layer 32, and a heat dissipation layer 31. The buffer layer 32 may be made of Super Clean Foam (SCF) and is located between the heat dissipation layer 31 and the adhesive layer 33, the adhesive layer 33 is made of a BF glue and adheres to the display panel 1, and a material of the heat dissipation layer 31 includes, but is not limited to, copper, which has the advantages of low cost, high heat dissipation coefficient, easy fabrication and fast heat dissipation.

As the technology of under-screen fingerprint recognition and the technology of under-screen camera emerge, the inventors have found that integration of antenna groups can be implemented using these under-screen technologies, and propose the following technical solutions, which will be described in detail in the following embodiments.

Figure 5:
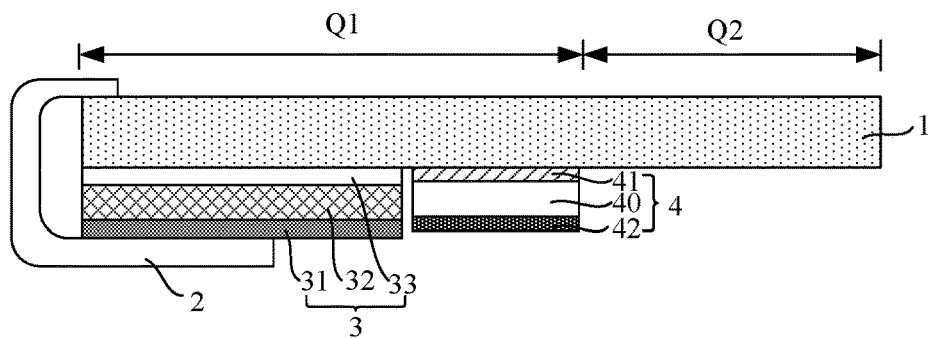
FIG. 5 is a sectional view of a display assembly according to an embodiment of the present disclosure.

In a first aspect, as shown in FIG. 5, an embodiment of the present disclosure provides a display assembly, which includes a display panel 1, a heat dissipation assembly 3, and an antenna assembly 4. The display panel 1 has a heat dissipation region Q1 and the remaining region Q2 of the display panel 1 except the heat dissipation region Q1. The heat dissipation assembly 3 and the antenna assembly 4 are both disposed on a side of the display panel 1 distal to a display surface of the display panel 1 and located in the heat dissipation region Q1.

It should be noted that an arrangement density of sub-pixels and a wiring density of an area of the display panel 1 corresponding to the antenna assembly 4 need to satisfy the requirement that microwave signals transmitted by the antenna assembly 4 can be radiated through the area.

In an embodiment of the present disclosure, the antenna assembly 4 is disposed at a certain position within the heat dissipation region Q1, thus effectively avoiding the problem that transmission of the microwave signals, especially the microwave signals having a complicated transmission path, is interfered due to the antenna assembly 4 being disposed at a border position of the display assembly. Disposing the antenna assembly 4 in the heat dissipation region Q1 can facilitate the transmission of the signals.

In some examples, an orthogonal projection of the antenna assembly 4 on a plane where the display panel 1 is located and an orthogonal projection of the heat dissipation assembly 3 on the plane where the display panel 1 is located may be arranged side by side, that is, the orthogonal projections of the antenna assembly 4 and the heat dissipation assembly 3 on the plane where the display panel 1 do not overlap each other. Alternatively, the antenna assembly 4 may be integrated in the heat dissipation assembly 3. For example, a slot may be formed in a middle area of the heat dissipation assembly 3 and provided therein with a feed cavity, and the antenna assembly 4 may be arranged on a side of the feed cavity proximal to the display surface. The feed cavity is configured to feed the microwave signals into the antenna assembly 4. A specific structure of the antenna assembly 4 is described in conjunction with the following specific examples.

In some examples, as shown in FIG. 5, the antenna assembly 4 may include a dielectric layer 40, at least one radiating element 41, and a reference electrode layer. The radiating element 41 is disposed on a side of the dielectric layer 40 proximal to the display panel 1, and the reference electrode layer is disposed on a side of the dielectric layer 40 distal to the display panel 1. For the convenience of control, the reference electrode layer may be a ground electrode layer 42. The reference electrode layer being the ground electrode layer 42 is taken as an example in the embodiment of the present disclosure.

Figure 6:
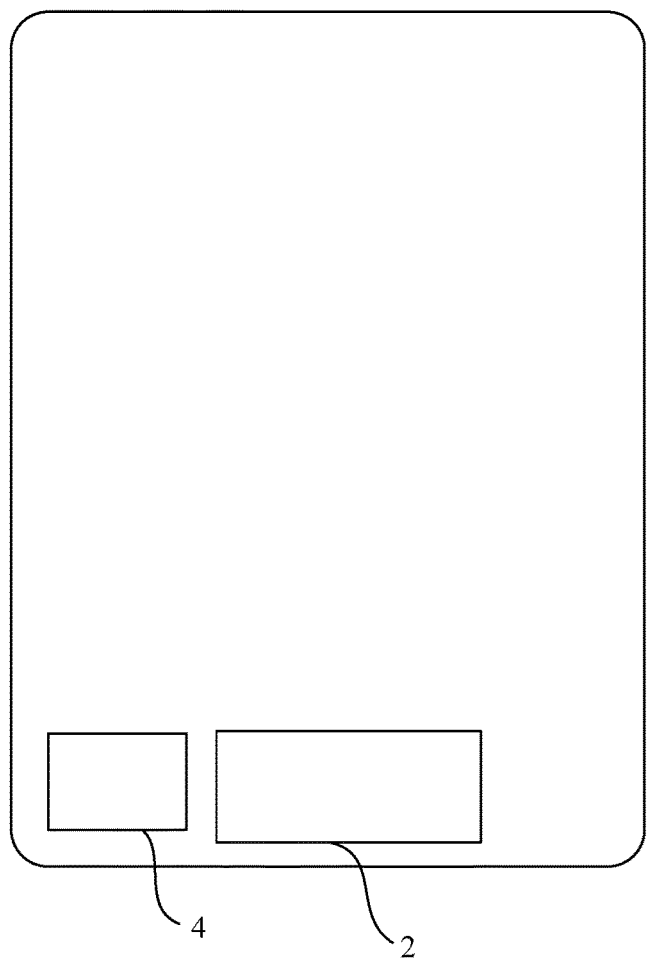
FIG. 6 is a top view of a display assembly according to an embodiment of the present disclosure.

Further, when the antenna assembly 4 and the heat dissipation assembly 3 are arranged side by side, the radiating element 41 may adopt a planar structure which facilitates increasing radiation efficiency of the microwave signals. In some examples, as shown in FIG. 6, an orthogonal projection of the flexible printed circuit board 2 on the plane where the display panel 1 is located and the orthogonal projection of the antenna assembly 4 on the plane where the display panel 1 is located do not overlap each other, which can effectively prevent the microwave signals from interfering signals transmitted by the flexible printed circuit board 2.

Further, the antenna assembly 4 may be a single-polarized antenna or a dual-polarized antenna, for example, with ±45° polarization. The antenna assembly 4 is further described below in conjunction with specific examples.

Figure 7:
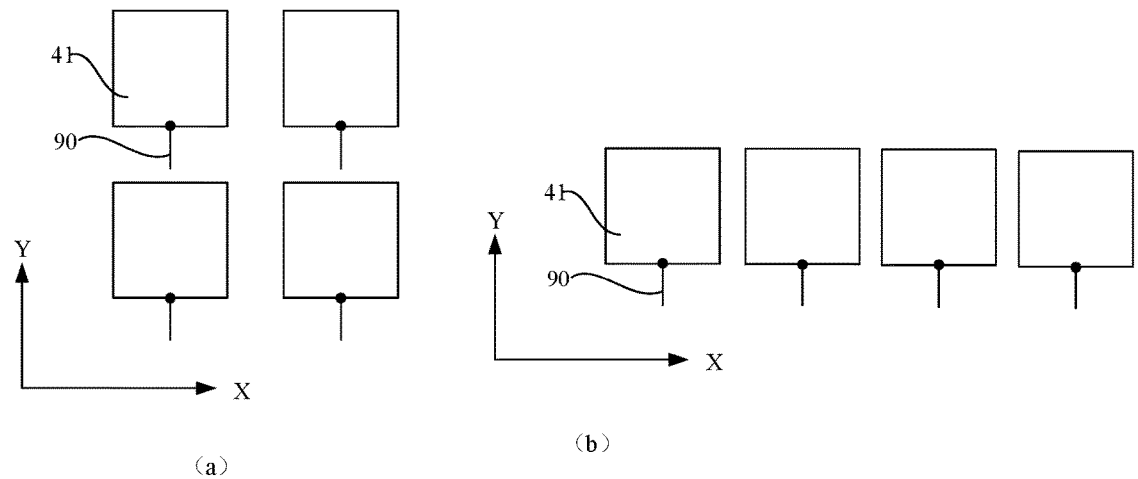
FIG. 7 is a layout diagram of an antenna assembly of a display assembly according to an embodiment of the present disclosure in a case where the antenna assembly is a single-polarized antenna.

In an example, as shown in FIG. 7, in a case where the antenna assembly 4 is the single-polarized antenna, the antenna assembly 4 not only includes the at least one radiating element 41, but also includes at least one feeder line 90. Each of the at least one radiating element 41 is connected to one of the at least one feeder line 90, for example, the at least one feeder line 90 is connected to the at least one radiating element 41 in a one-to-one correspondence way. In some examples, a position of a connection node between each radiating element 41 and the corresponding feeder line 90 is constant (i.e., unchanged). Specifically, taking radiating elements 41 being square radiating elements 41 as an example, each of the radiating elements 41 includes a first side (a left side) and a second side (a right side), which are disposed opposite to each other along a first direction, and a third side (an upper side) and a fourth side (a lower side), which are disposed opposite to each other along a second direction. Each of feeder lines 90 is connected to a midpoint of the fourth side of the corresponding radiating element 41, and an extension direction of each of the feeder lines 90 is the second direction.

Figure 8:
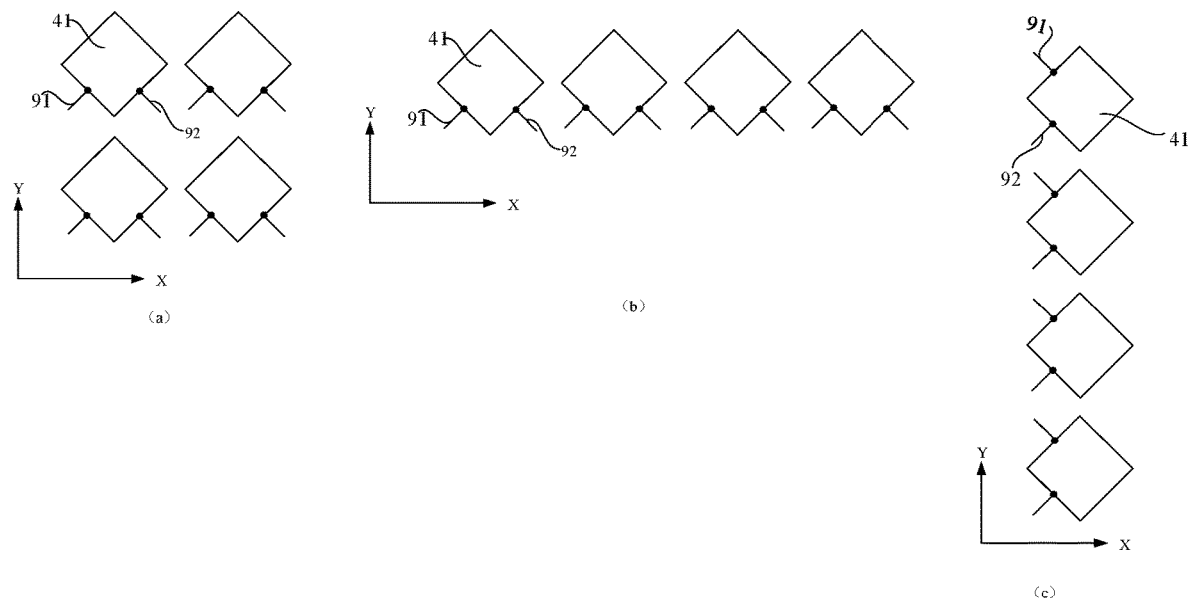
FIG. 8 is a layout diagram of an antenna assembly of a display assembly according to an embodiment of the present disclosure in a case where the antenna assembly is a dual-polarized antenna.
Figure 9:
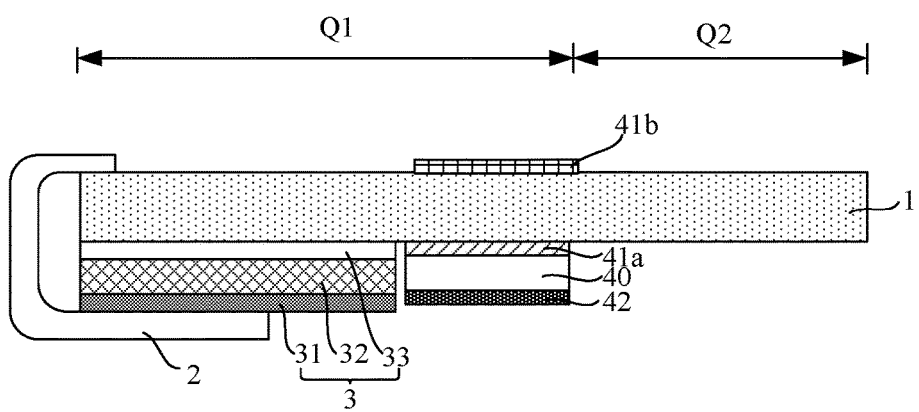
FIG. 9 is a sectional view of a display assembly according to an embodiment of the present disclosure.

In an example, as shown in FIG. 8 and FIG. 9, in a case where the antenna assembly 4 is the dual-polarized antenna, the antenna assembly 4 not only includes the at least one radiating element 41, but also includes at least one first feeder line 91 and at least one second feeder line 92. Each of the at least one radiating element 41 is respectively connected to one of the at least one first feeder line 91 and one of the at least one second feeder line 92. For any one first radiating element 41*a*, connection nodes between the first radiating element 41*a* and both the corresponding first feeder line 91 and the corresponding second feeder line 92 are a first node and a second node, respectively; and a connecting line between the first node and a center of the first radiating element 41*a* and a connecting line between the second node and the center of the first radiating element 41*a* form a certain angle. At least one of the first feeder line 91 and the second feeder line 92 is a microstrip line. In an embodiment of the present disclosure, a case where both the first feeder line 91 and the second feeder line 92 are microstrip lines is taken as an example. Further, a feeding direction of the first feeder line 91 differs from a feeding direction of the second feeder line 92 by 90°. For example, the feeding direction of one of the first feeder line 91 and the second feeder line 92 is +45°, and the feeding direction of the other one of the first feeder line 91 and the second feeder line 92 is −45°. For example, the feeding direction of the first feeder line 91 is +45°, and the feeding direction of the second feeder line 92 is −45°. When the radiating element 41 is rotated by 90°, the feeding direction of the first feeder line 91 is 0°, and the feeding direction of the second feeder line 92 is 90°. In embodiments of the present disclosure, a case where the feeding direction of the first feeder line 91 is +45° and the feeding direction of the second feeder line 92 is −45° is taken as an example, and the antenna assembly is a ±45° polarized antenna in such a case.

In some examples, as shown in FIG. 9, the antenna assembly 4 may include a dielectric layer 40, at least one first radiating element 41*a*, at least one second radiating element 41*b*, and a ground electrode layer 42. The dielectric layer 40 is disposed on the side of the display panel 1 distal to the display surface, the first radiating element 41*a* is disposed on a side of the dielectric layer 40 proximal to the display panel 1, the reference electrode layer is disposed on a side of the dielectric layer 40 distal to the display panel 1, and the second radiating element 41*b* is disposed on a side of the display panel 1 proximal to the display surface (e.g., on the display surface of the display panel 1). An orthogonal projection of each first radiating element 41*a* on the dielectric layer 40 and an orthogonal projection of a corresponding second radiating element 41*b* on the dielectric layer 40 at least partially overlap each other. For example, the at least one first radiating element 41*a* and the at least one second radiating element 41*b* are arranged in a one-to-one correspondence way, and a center of an orthogonal projection of each of the at least one first radiating element 41*a* on the plane where the display panel 1 is located coincides with a center of an orthogonal projection of the corresponding one of the at least one second radiating element 41*b* on the plane where the display panel 1 is located. Both the orthogonal projection of each first radiating element 41*a* on the dielectric layer 40 and the orthogonal projection of the corresponding second radiating element 41*b* on the dielectric layer 40 overlap an orthogonal projection of the ground electrode layer 42 on the dielectric layer 40. Compared with providing one radiating element 41, providing the first radiating element 41a and the corresponding second radiating element 41b together for radiation of the microwave signals can effectively increase the radiation efficiency of the microwave signals. It should be noted that the first radiating element 41a and the corresponding second radiating element 41b may be the same or different in size, although the center of the orthogonal projection of the first radiating element 41a on the plane where the display panel 1 is located coincides with the center of the orthogonal projection of the corresponding second radiating elements 41b on the plane where the display panel 1 is located. The sizes of the first radiating element 41a and the corresponding second radiating element 41b may be adjusted according to a frequency band requirement. It should be noted that, since the second radiating element 41b is disposed on the display surface of the display panel 1, the second radiating element 41b may adopt a metal mesh structure in order to avoid affecting a display effect of the display panel 1. The metal mesh may include a plurality of first metal lines that intersect each other and a plurality of second metal lines that intersect each other. Light transmittance of the metal mesh is about 70% to 88%. Since the first radiating element 41a is located on the side of the display panel 1 distal to the display surface, the first radiating element 41a may adopt a planar structure or a metal mesh structure. For a similar reason, the ground electrode layer 42 is configured in the same way as the first radiating element 41a. In an example, each of the first radiating element 41a, the second radiating element 41b and the ground electrode layer 42 adopts the metal mesh structure. A material of the metal mesh structure includes, but is not limited to, at least one of copper (Cu), aluminum (Al), molybdenum (Mo), and silver (Ag). In some examples, hollow portions of the metal mesh structure may be triangular, rhombic, square, etc.

Figure 10:
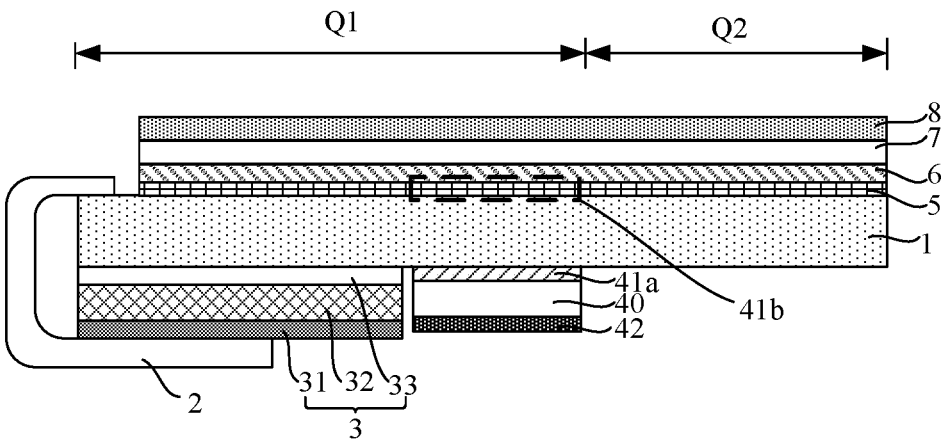
FIG. 10 is a sectional view of a display assembly according to an embodiment of the present disclosure.
Figure 11:
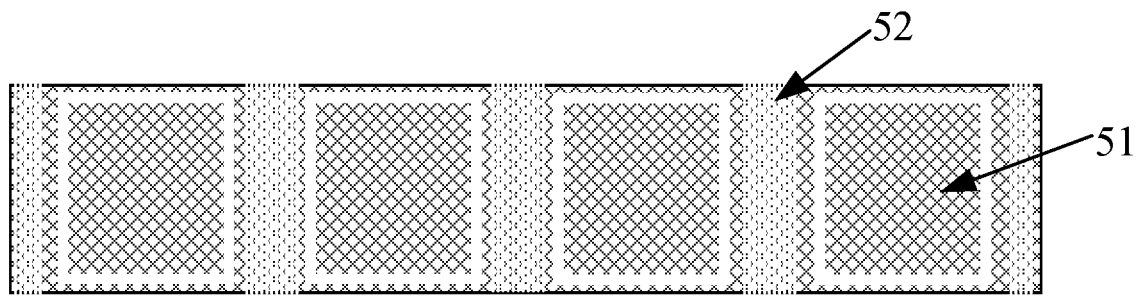
FIG. 11 is a top view of a touch layer of a display assembly according to an embodiment of the present disclosure.

In some examples, as shown in FIG. 10 and FIG. 11, in addition to including the above structures, the display assembly may include a touch assembly, which may include a base substrate and a touch layer 5 disposed on the base substrate. The touch layer 5 includes touch electrodes 51 arranged in an array, and some touch electrodes 51 located in the heat dissipation region Q1 serve as the second radiating elements 41b in a time-division multiplexing manner. That is, touch signals are written to the touch electrodes 51 located in the heat dissipation region Q1 in a touch stage, and the touch electrodes 51 located in the heat dissipation region Q1 radiate the microwave signals in a microwave signal radiation stage.

In some examples, as shown in FIG. 11, the touch layer 5 adopts the metal mesh structure and includes touch electrodes 51 and redundant electrodes 52 each located between any adjacent two touch electrodes 51, with the redundant electrodes 52 being discontinuous with edges of the adjacent touch electrodes 51. A first radiation layer includes a metal mesh, which may include a plurality of first metal lines that intersect each other and a plurality of second metal lines that intersect each other. All the first metal lines are arranged side by side along a first direction and extend along a second direction; all the second metal lines are arranged side by side along the first direction and extend along a third direction. In such a case, the first metal lines and the second metal lines are discontinuous at bordering positions between each redundant electrode 52 and an adjacent touch electrode 51. Moreover, the first metal lines and the second metal lines in the redundant electrodes 52 are discontinuous at positions where the first metal lines cross the second metal lines. In such a case, the redundant electrodes 52 and the touch electrodes 51 may be formed by a single patterning process, and may be formed by forming a whole layer of the first metal lines and the second metal lines crossing the first metal lines, and then performing a cutting process on the first metal lines and the second metal lines.

In some examples, when the antenna assembly 4 includes the dielectric layer 40, the first radiating elements 41a, the second radiating elements 41b, and the ground electrode layer 42, the antenna assembly 4 may further include the feeder lines 90. When being the single-polarized antenna, the antenna assembly 4 includes at least one feeder line 90, and each first radiating element 41a is connected to one of the at least one feeder line 90, that is, the first radiating elements 41a are connected to feeder lines 90 in a one-to-one correspondence way. In some examples, a position of a connection node between each of the first radiating elements 41a and the corresponding feeder line 90 is constant (or unchanged). Specifically, taking the first radiating elements 41a being square radiating elements 41 as an example, each of the first radiating elements 41a includes a first side (a left side) and a second side (a right side), which are disposed opposite to each other along a first direction, and a third side (an upper side) and a fourth side (a lower side), which are disposed opposite to each other along a second direction. Each of the feeder lines 90 is connected to a midpoint of the fourth side of the corresponding first radiating element 41a, and an extension direction of each of the feeder lines 90 is the second direction.

In an example, when the antenna assembly 4 is the dual-polarized antenna, the at least one feeder line 90 includes at least one first feeder line 91 and at least one second feeder line 92. Each radiating element 41 is respectively connected to one of the at least one first feeder line 91 and one of the at least one second feeder line 92. For any one first radiating elements 41a, a connection node between the radiating element 41 and the first feeder line 91 and a connection node between the radiating element 41 and the second feeder line 92 are a first node and a second node, respectively; and a connecting line between the first node and a center of the first radiating element 41a and a connecting line between the second node and the center of the first radiating element 41a form a certain angle. At least one of the first feeder line 91 and the second feeder line 92 is a microstrip line. In an embodiment of the present disclosure, a case where both the first feeder line 91 and the second feeder line 92 are microstrip lines is taken as an example. Further, a feeding direction of the first feeder line 91 differs from that of the second feeder line 92 by 90°. For example, the feeding direction of one of the first feeder line 91 and the second feeder line 92 is +45°, and the feeding direction of the other one of the first feeder line 91 and the second feeder line 92 is −45°. For example, the feeding direction of the first feeder line 91 is +45°, and the feeding direction of the second feeder line 92 is −45°. When the radiating element 41 is rotated by 90°, the feeding direction of the first feeder line 91 is 0°, and the feeding direction of the second feeder line 92 is 90°. In embodiments of the present disclosure, a case where the feeding direction of the first feeder line 91 is +45° and the feeding direction of the second feeder line 92 is −45° is taken as an example, and the antenna assembly is a ±45° polarized antenna in such a case.

Whether the antenna assembly is the single-polarized antenna or the dual-polarized antenna, as shown in FIG. 7 and FIG. 8, a plurality of antenna units (i.e., one radiating element 41 is one antenna unit) in the antenna assembly 4 may be arranged in an array, or may be arranged side by side along the first direction, or may be arranged side by side along the second direction.

In some examples, a material of the dielectric layer 40 includes, but is not limited to, a flexible material such as polyimide (PI) or polyethylene terephthalate (PET). Apparently, the dielectric layer 40 may alternatively be a glass base. In some examples, when the dielectric layer 40 is made of PET, the dielectric layer 40 has a thickness of 250 μm and a dielectric constant of 3.34.

Figure 12:
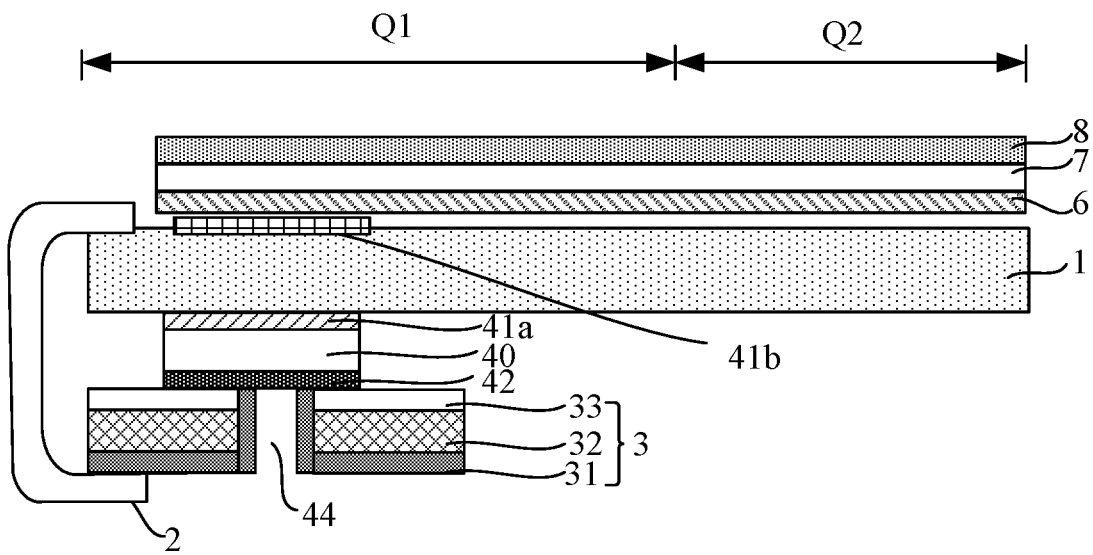
FIG. 12 is a sectional view of a display assembly according to an embodiment of the present disclosure.
Figure 13:
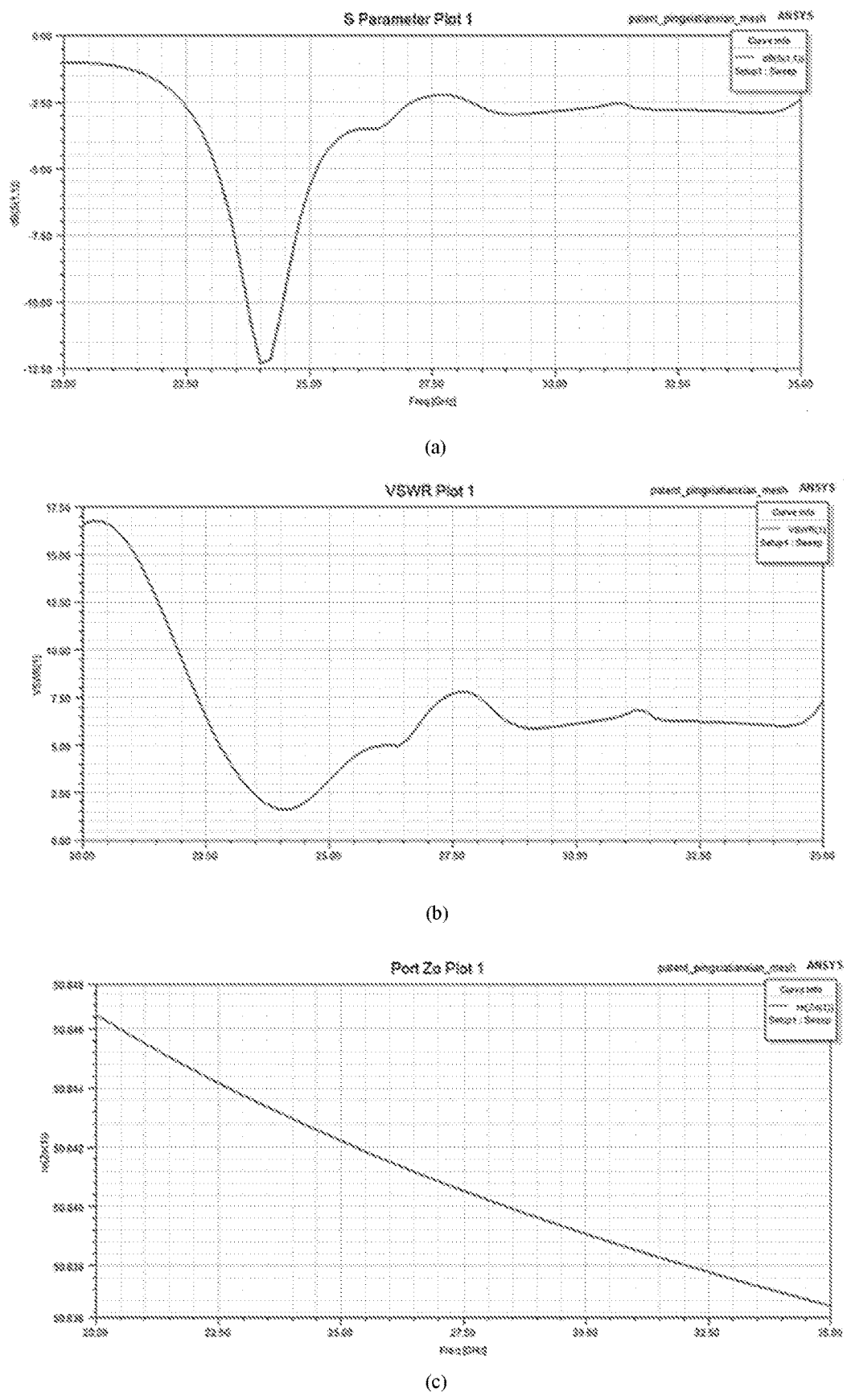
FIG. 13 is a simulation diagram of S-parameter, voltage standing wave ratio (VSWR) and impedance of a simulation model of an antenna assembly shown in FIG. 12.
Figure 14:
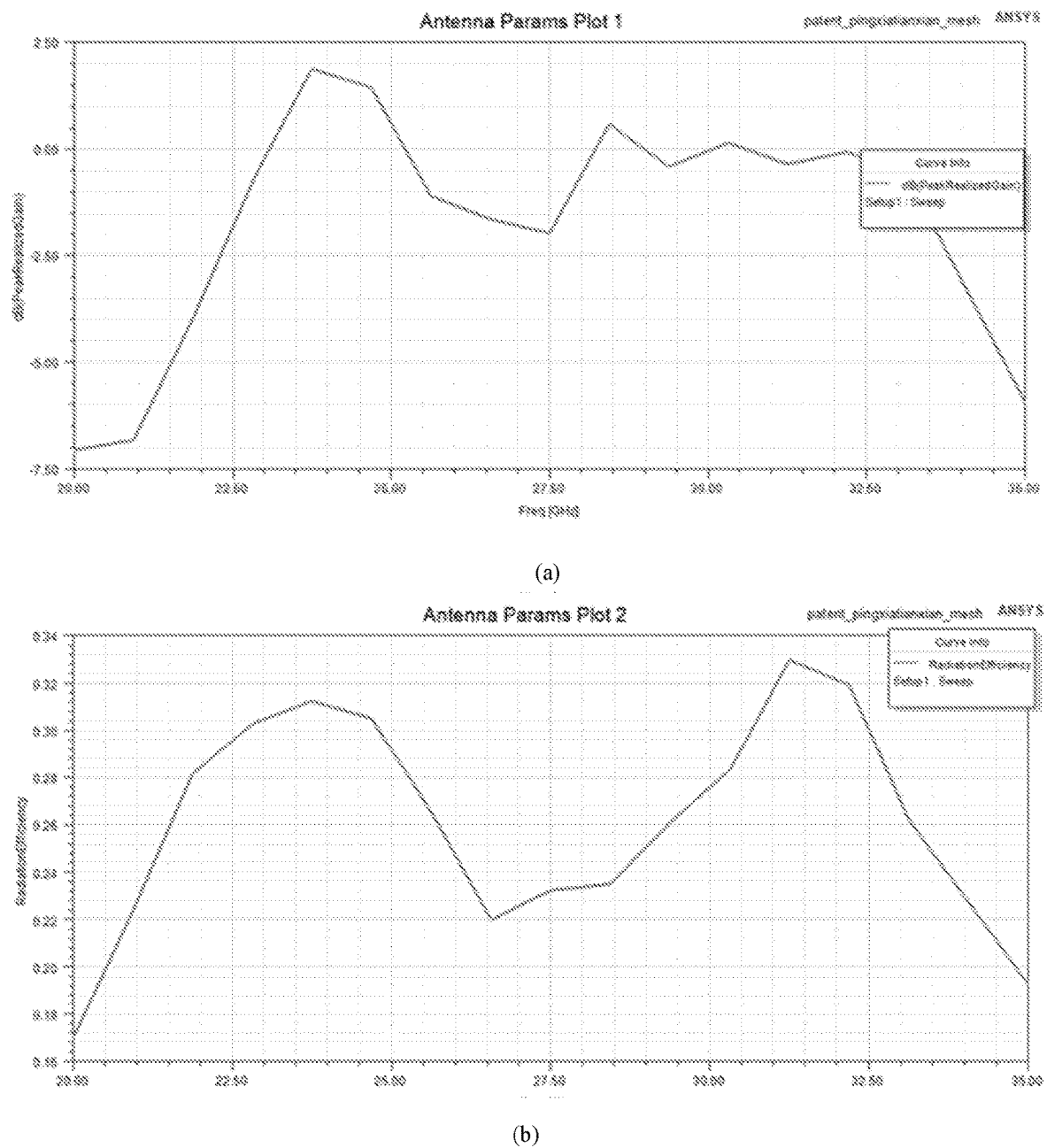
FIG. 14 is a simulation diagram of gain and efficiency of the antenna assembly shown in FIG. 12.

In some examples, as shown in FIG. 12, the antenna assembly 4 is integrated in the heat dissipation assembly 3. For example, the heat dissipation assembly 3 includes the adhesive layer 33, the buffer layer 32 and the heat dissipation layer 31, a slot is formed in a middle area of the heat dissipation assembly 3 and provided therein with a feed cavity, and the antenna assembly 4 is disposed on a side of the feed cavity proximal to the display surface. The feed cavity is configured to feed the microwave signals into the antenna assembly 4. The antenna assembly 4 may be any one of the antenna assemblies 4 described above. In such a case, the material of the dielectric layer 40 in the antenna assembly 4 may be a material with a high dielectric constant, such as ceramic, so that the radiation efficiency may be increased. FIG. 12 illustrates an example where the antenna assembly 4 includes the first radiating element 41a and the second radiating element 41b, but the present disclosure is not limited thereto. FIG. 13 is a simulation diagram of S-parameter ((a) in FIG. 13), voltage standing wave ratio (VSWR) ((b) in FIG. 13), and impedance ((c) in FIG. 13) of a simulation model of the antenna assembly 4 shown in FIG. 12, and FIG. 14 is a simulation graph of gain and efficiency of the antenna assembly 4 shown in FIG. 12. As shown in FIG. 13 and FIG. 14, it can be seen from the simulation results that a signal transmitted by the antenna assembly 4 located in the display panel 1 can pass through the display panel 1, the highest gain thereof can reach 2 dB as shown by (a) in FIG. 14, and the efficiency thereof is more than 25% as shown by (b) in FIG. 14. The gain and the efficiency are of a single antenna unit, and the gain may be greatly improved if the antenna units are arranged in an array.

Figure 15:
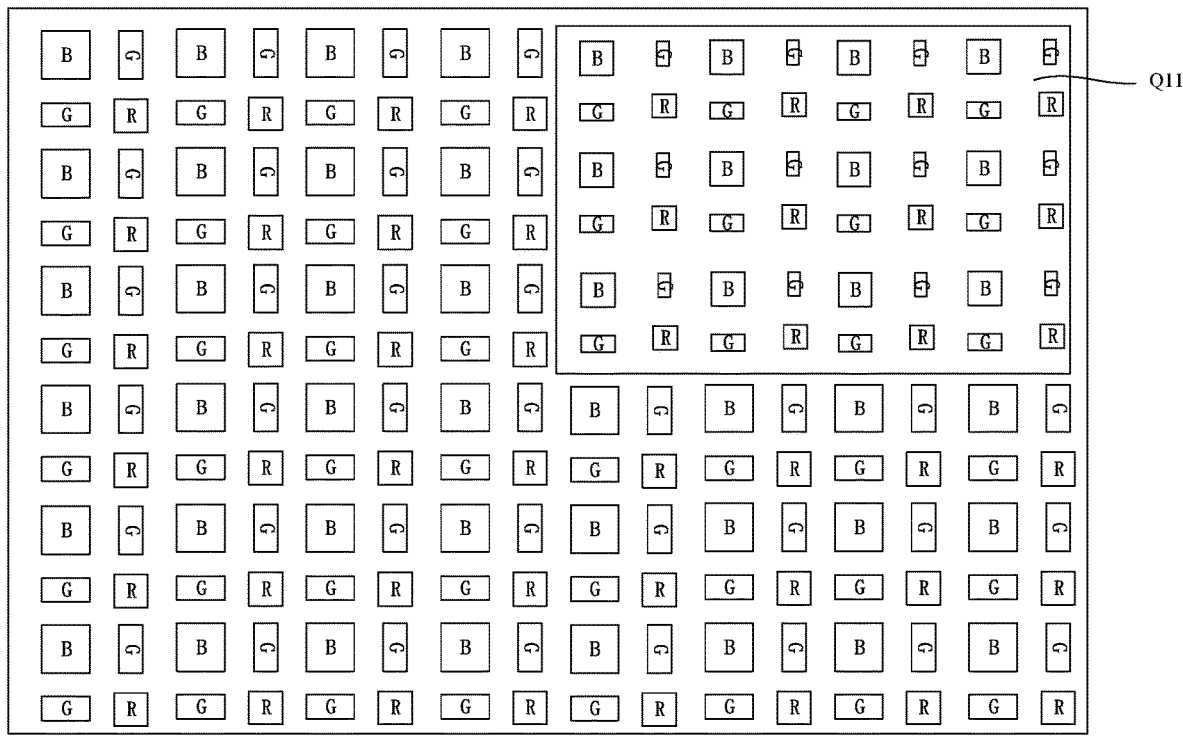
FIG. 15 is a plan view of a display panel according to an embodiment of the present disclosure.

In some examples, as shown in FIG. 15, no matter the antenna assembly 4 is any one of the above-described antenna assemblies and disposed at any one of the above-described positions, an arrangement density of the sub-pixels in a region Q11 of the display panel 1, which overlaps the orthogonal projection of the antenna assembly 4 on the display panel 1, is smaller than an arrangement density of the sub-pixels in the other region of the display panel 1 in the embodiment of the present disclosure. The arrangement densities are so set that the microwave signals radiated by the antenna assembly 4 can pass through the display panel 1 well. In the embodiment of the present disclosure, the arrangement density of the sub-pixels is determined by intervals between adjacent sub-pixels, the larger the intervals, the smaller the arrangement density, and vice versa. Since the arrangement density of the sub-pixels in the region of the display panel, which overlaps the orthogonal projection of the antenna assembly on the display panel, is smaller than that of the sub-pixels in the other region of the display panel, a display difference between the region and the other region may be compensated through a design of the pixels or through a compensation algorithm.

In some examples, the display assembly not only includes the above structures, but also includes a polarizer 6 disposed on the display surface of the display panel 1, a coating of a conductive optical adhesive 7 disposed on a side of the polarizer 6 distal to the display panel 1, and a cover plate 8 disposed on a side of the conductive optical adhesive 7 distal to the display panel 1. It should be noted that, in the case where the antenna assembly 4 includes the second radiating element(s) 41b, the second radiating element(s) 41b may be disposed on a side of the polarizer proximal to the display panel 1.

The polarizer 6 is an optical film which converts light emitted from the display panel 1 into polarized light. The polarizer is an optical component formed by a plurality of film layers, and includes a Poly Vinyl Alcohol (PVA) layer, a Tri-Acetate Cellulose (TAC) layer, a Pressure Sensitive Adhesive (PSA) layer, a release film, a protective film, and a compensation film.

In some examples, the cover plate 8 includes a first glass layer, an adhesive interlayer, and a second glass layer, and the first glass layer adheres to and is fixed with the second glass layer through the adhesive interlayer. The adhesive interlayer may deform under impact, so as to endow the cover plate 8 with impact resistance and prevent the cover plate 8 from being easily broken. Even if the first and second glass layers are broken, pieces of glass produced after the breakage may not splash because the first glass layer adheres to and is fixed with the second glass layer through the adhesive interlayer, which improves security of the display assembly.

In some examples, the display assembly according to the embodiments of the present disclosure may be any product or component having a display function, such as a mobile phone, a tablet computer, a television, a display, a notebook computer, a digital photo frame or a navigator, but the embodiments of the present disclosure are not limited thereto.

It should be understood that the above implementations are merely exemplary implementations adopted to illustrate the principle of the present disclosure, and the present disclosure is not limited thereto. Various modifications and improvements can be made therein by one of ordinary sill in the art without departing from the spirit and essence of the present disclosure, and these modifications and improvements are considered to fall within the scope of the present disclosure.

What is claimed is:

1. A display assembly, comprising:
   a display panel with a heat dissipation region;
   a heat dissipation assembly in the heat dissipation region and on a side of the display panel distal to a display surface of the display panel;
   an antenna assembly in the heat dissipation region, with at least part of the antenna assembly located on the side of the display panel distal to the display surface; and
   a flexible printed circuit board bonded to the display panel, wherein an orthogonal projection of the flexible printed circuit board on the display panel and an orthogonal projection of the antenna assembly on the display panel do not overlap each other when the flexible printed circuit board is folded to the side of the display panel distal to the display surface.

2. The display assembly of claim 1, wherein the antenna assembly is only located on the side of the display panel distal to the display surface; the antenna assembly comprises a dielectric layer, at least one radiating element on a side of the dielectric layer proximal to the display panel, and a reference electrode layer on a side of the dielectric layer distal to the display panel; and orthogonal projections of the radiating element and the reference electrode layer on the dielectric layer at least partially overlap each other.

3. The display assembly of claim 2, wherein the antenna assembly further comprises at least one feeder line, and each of the at least one radiating element is connected to one of the at least one feeder line.

4. The display assembly of claim 2, wherein the antenna assembly further comprises at least one first feeder line and at least one second feeder line, each of the at least one radiating element is respectively connected to one of the at least one first feeder line and one of the at least one second feeder line, and for any one radiating element, a connection node between the radiating element and a connected first feeder line and a connection node between the radiating element and a connected second feeder line are a first node and a second node, respectively; and a connecting line between the first node and a center of the radiating element and a connecting line between the second node and the center of the radiating element form a certain angle.

5. The display assembly of claim 1, wherein the antenna assembly comprises a dielectric layer on the side of the display panel distal to the display surface, at least one first radiating element on a side of the dielectric layer proximal to the display panel, a reference electrode layer on a side of the dielectric layer distal to the display panel, and at least one second radiating element on the display surface, and an orthogonal projection of each first radiating element on the dielectric layer and an orthogonal projection of a corresponding second radiating element on the dielectric layer at least partially overlap each other; and both an orthogonal projection of the first radiating element on the dielectric layer and an orthogonal projection of the corresponding second radiating element on the dielectric layer at least partially overlap an orthogonal projection of the reference electrode layer on the dielectric layer.

6. The display assembly of claim 5, wherein the antenna assembly further comprises at least one feeder line, and each of the at least one first radiating element is connected to one of the at least one feeder line.

7. The display assembly of claim 5, wherein the antenna assembly further comprises at least one first feeder line and at least one second feeder line, each of the at least one first radiating element is respectively connected to one of the at least one first feeder line and one of the at least one second feeder line, and for any one first radiating element, a connection node between the first radiating element and a connected first feeder line and a connection node between the first radiating element and a connected second feeder line are a first node and a second node, respectively; and a connecting line between the first node and a center of the first radiating element and a connecting line between the second node and the center of the first radiating element form a certain angle.

8. The display assembly of claim 5, further comprising a touch layer on the display surface of the display panel, wherein the touch layer comprises a plurality of touch electrodes in an array, and some touch electrodes in the heat dissipation region serve as second radiating elements in a time-division multiplexing manner.

9. The display assembly of claim 8, wherein the touch layer further comprises redundant electrodes on the same layer as the touch electrodes and between adjacent touch electrodes, with the redundant electrodes being discontinuous with edges of the touch electrodes.

10. The display assembly of claim 5, wherein at least the second radiating element is a metal mesh structure.

11. The display assembly of claim 1, wherein the display panel comprises a plurality of sub-pixels, and an arrangement density of the sub-pixels in a region of the display panel, which overlaps an orthogonal projection of the antenna assembly on the display panel, is smaller than an arrangement density of the sub-pixels in the other region of the display panel.

12. The display assembly of claim 1, wherein the antenna assembly and the heat dissipation assembly are disposed side by side.

13. The display assembly of claim 1, wherein a slot is formed in a middle area of the heat dissipation assembly and provided therein with a feed cavity, and the antenna assembly is disposed on a side of the feed cavity proximal to the display surface.

14. The display assembly of claim 1, wherein the heat dissipation assembly comprises a heat dissipation layer, a buffer layer, and an adhesive layer, the buffer layer is between the heat dissipation layer and the adhesive layer, and the adhesive layer adheres to the display panel.

15. The display assembly of claim 2, wherein the display panel comprises a plurality of sub-pixels, and an arrangement density of the sub-pixels in a region of the display panel, which overlaps an orthogonal projection of the antenna assembly on the display panel, is smaller than an arrangement density of the sub-pixels in the other region of the display panel.

16. The display assembly of claim 5, wherein the display panel comprises a plurality of sub-pixels, and an arrangement density of the sub-pixels in a region of the display panel, which overlaps an orthogonal projection of the antenna assembly on the display panel, is smaller than an arrangement density of the sub-pixels in the other region of the display panel.

17. The display assembly of claim 2, wherein a slot is formed in a middle area of the heat dissipation assembly and provided therein with a feed cavity, and the antenna assembly is disposed on a side of the feed cavity proximal to the display surface.

18. The display assembly of claim 5, wherein a slot is formed in a middle area of the heat dissipation assembly and provided therein with a feed cavity, and the antenna assembly is disposed on a side of the feed cavity proximal to the display surface.

* * * * *